INVENTORS.
LLOYD W. HILTY &
ROBERT W MAIER

June 30, 1970  L. W. HILTY ET AL  3,517,576

CUTTING PROCESS

Original Filed March 24, 1965  3 Sheets-Sheet 1

INVENTORS.
LLOYD W. HILTY &
ROBERT W. MAIER

June 30, 1970　　　L. W. HILTY ET AL　　　3,517,576
CUTTING PROCESS
Original Filed March 24, 1965　　　3 Sheets-Sheet 3
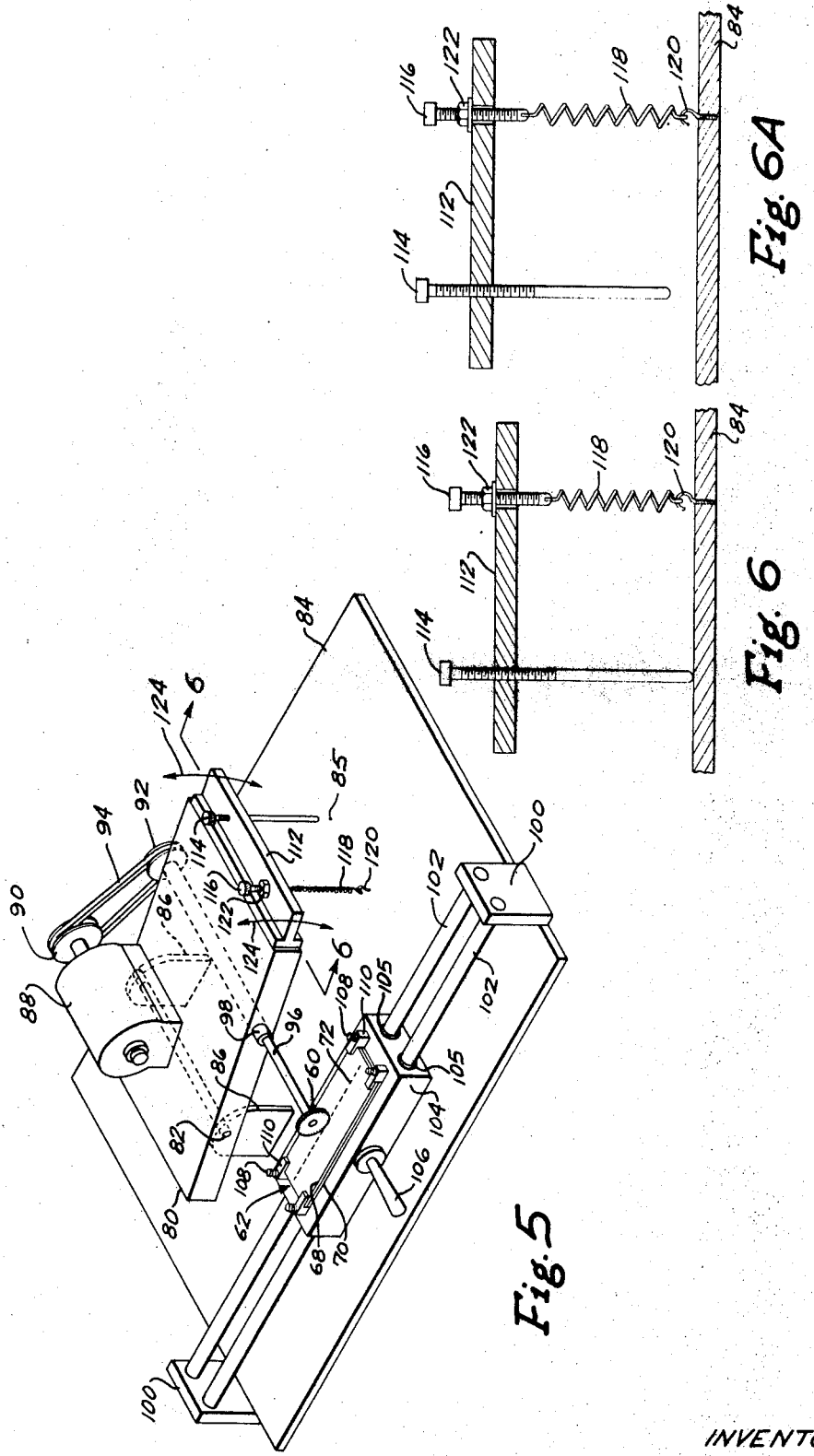
INVENTORS.
LLOYD W. HILTY &
ROBERT W. MAIER United States Patent Office 3,517,576
Patented June 30, 1970

3,517,576
CUTTING PROCESS
Lloyd W. Hilty, Allegheny Township, Westmoreland County, and Robert W. Maier, Oakmont, Pa., assignors to Gulf Research & Development Company, Pittsburgh, Pa., a corporation of Delaware
Original application Mar. 24, 1965, Ser. No. 442,260, now Patent No. 3,388,414, dated June 18, 1968. Divided and this application Nov. 9, 1967, Ser. No. 681,777
Int. Cl. B26d 3/06
U.S. Cl. 83—5                7 Claims

ABSTRACT OF THE DISCLOSURE

A process for producing a uniform shallow cut or scratch through a relatively soft coating, such as paint, on a hard base material, such as steel, without injuring or scratching the hard base. The cutting means is gravity biased towards the material being cut and is provided with spring means to cooperate with said gravity bias in urging the cutting means towards the material during the cutting operation so that no external downward force is required on said apparatus. The resiliency provided by the spring means permits the cutting means to penetrate through a shallow layer of paint on a steel surface without scratching even upwardly projecting peaks on said steel surface.

---

Figure 2:
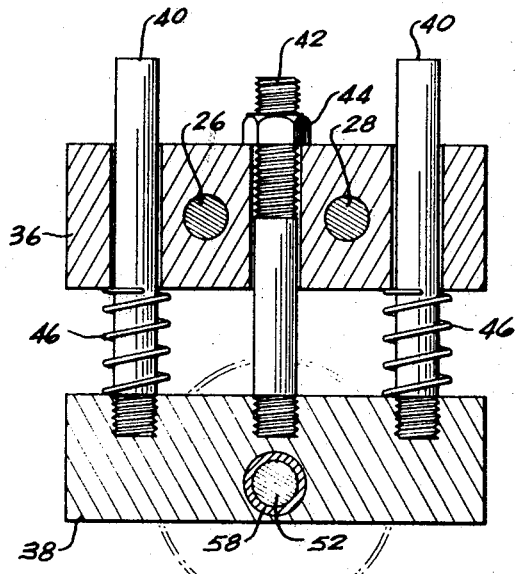

This application is a division of Ser. No. 442,260, filed Mar. 24, 1965, now U.S. 3,388,414.

This invention relates to a process for producing a longitudinal cut in a laminated material.

In many instances it is advantageous to produce a shallow cut or scratch through a relatively soft coating of a hard material without the cut or scratch penetrating the relatively hard base. One such instance arises in a method for testing the corrosion resistance of paints or other surface coatings. According to this method, a layer of paint which may be one quarter inch or more in thickness is applied to a base material such as sheet steel. A portion of the painted surface is scratched to remove all the paint in the region of the scratch down to the surface of the steel. It is important that the cut or scratch penetrate entirely through the coating up to the surface of the steel but without substantially penetrating or scratching the surface of the steel. The scratched material is then utilized in prolonged service under corrosive conditions. Following prolonged use the extent of corrosion occurring at the scratched surface is compared with the extent of corrosion occurring at the portion of the surface where the paint coating is undisturbed. Also, the area surrounding the scratched surface is observed to determine whether the paint permits the corrosive material to penetrate under itself in the vicinity of a scratch, as evidenced by peeling or flaking of the paint at said vicinity.

In making the cut on the painted surface it is difficult to remove all the paint without injuring or scratching the steel plate. This difficulty arises because the metal surface to which the paint is applied is usually not entirely flat but exhibits peaks and valleys to a cutting tool. A similar difficulty arises when it is desired to carve a longitudinal cut in any other laminated material having a relatively soft upper lamina, such as wood or plastic, bonded to a relatively hard lower lamina, such as steel, where the surface of the lower lamina is irregular and exhibits peaks and valleys to the cutting tool. The difficulty arises both where it is desired to carve a groove through the total depth of the upper lamina down to the surface of the lower lamina or where it is desired to carve a groove of uniform depth only partially through the relatively soft upper lamina but where there are peaks in the lower lamina which are sufficiently high to project upwardly above the level of said cut.

According to the method of this invention, a longitudinal cut is carved through an upper and relatively soft lamina of a laminated material so that the cut follows the contour of at least the peaks of a lower and relatively hard lamina of said laminated material by moving a cutting tool longitudinally relative to said material, resiliently and continuously urging said cutting tool to penetrate the relatively soft upper lamina, mechanically limiting the maximum depth of penetration of the cutting tool into the relatively soft lamina, the cutting tool being forced to resiliently retract upon contact with peaks in said relatively hard lamina so that the cutting tool follows the contour of said peaks without penetrating the relatively hard lamina, the cutting tool continuously being urged to return to the desired depth of penetration when out of contact with said peaks, and preventing overshoot penetration of said cutting tool into said laminated material directly following contact of said cutting tool with said peaks.

An apparatus to be utilized by the process of this invention comprises a rotatable shaft having cutting means secured thereto, resilient support means for said shaft, said shaft supported by the resilient support means but rotatable relative to the resilient support means so that said shaft rotates independently of the support means and so that said shaft means and said support means are otherwise jointly resilient, anchor means secured in a stationary position relative to said support means, said support means vertically moveable relative to the anchor means, spring means between the support means and the anchor means adapted to urge said cutting means into said material, and stop means extending between said shaft support means and said anchor means adapted to limit the maximum cut depth in said material.

Figure 2A:
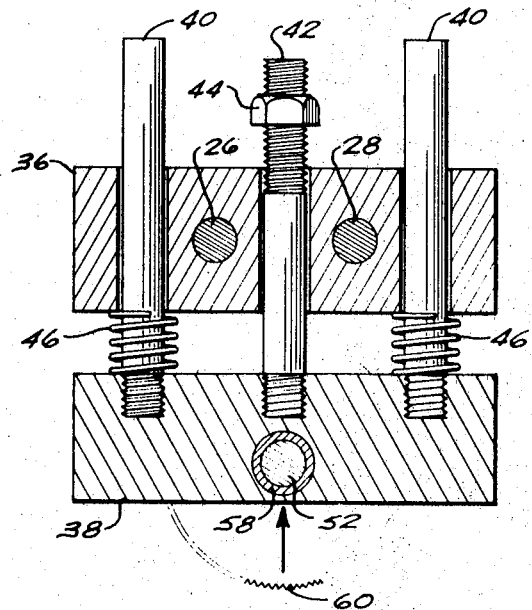
Figure 3:
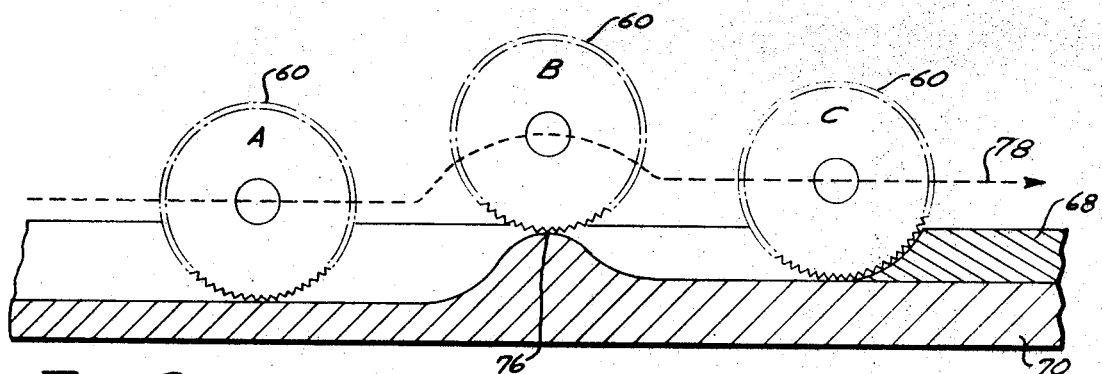
Figure 4:
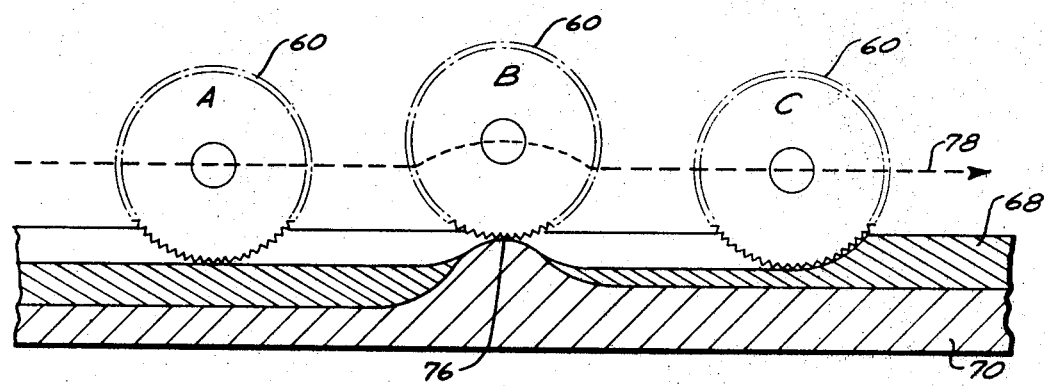
Figure 1:
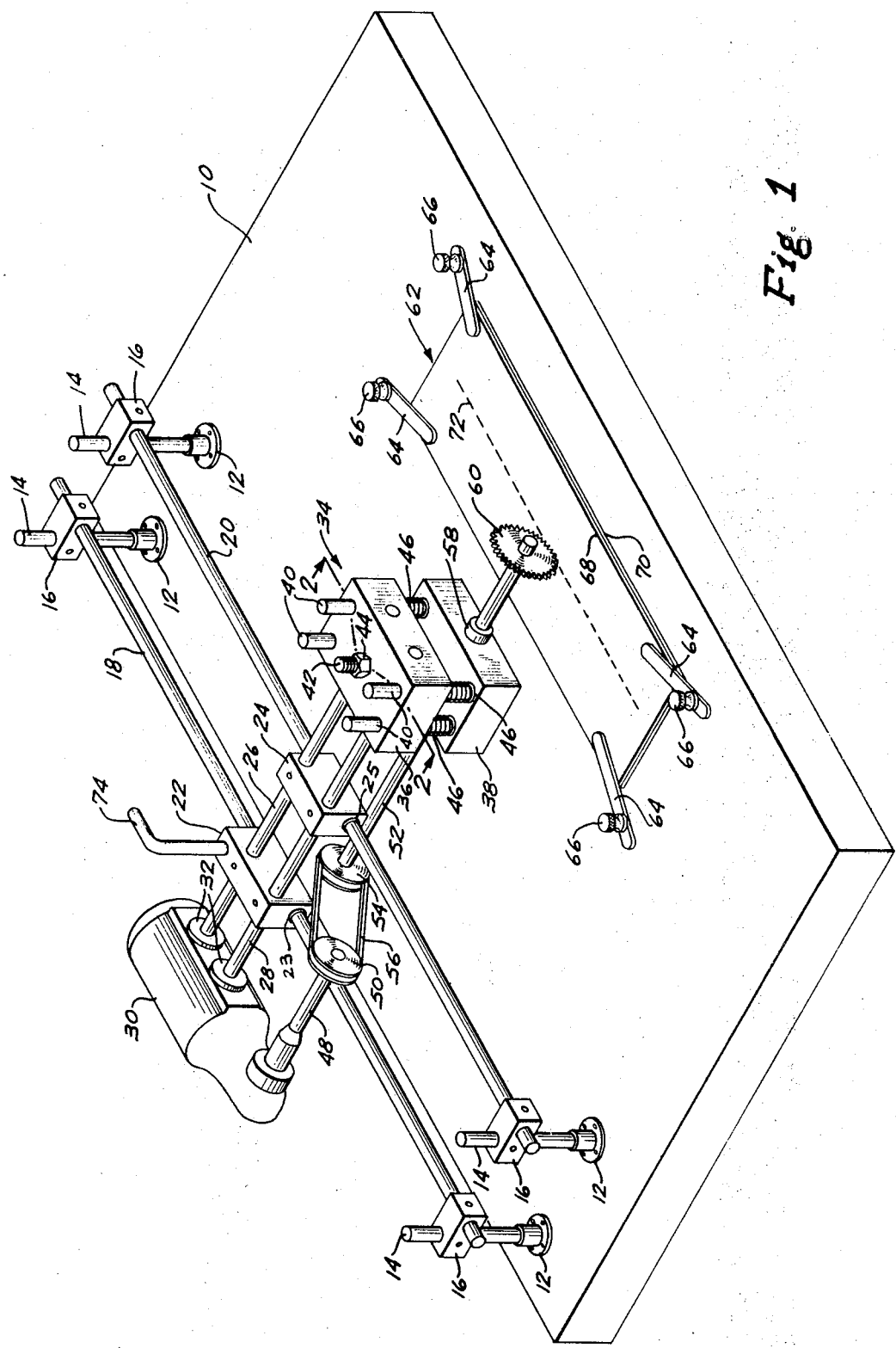

The present invention will become more apparent by reference to the drawings in which FIG. 1 is a perspective view of one embodiment of an apparatus for carrying out the process of this invention, FIGS. 2 and 2A are two views through the section 2—2 of FIG. 1, each view showing the same parts but in a different relative position, FIG. 3 is a view showing the locus of the axis of a rotating cutting tool as the tool cuts completely through an upper lamination while following the contour of a lower lamination of a work sample, FIG. 4 is a view showing the locus of the axis of a rotating cutting tool as the tool cuts partially through an upper lamination while following the contour of only the peaks of a lower lamination of a work sample, FIG. 5 is a perspective view of another embodiment of an apparatus for carrying out the process of this invention, and FIGS. 6 and 6A are two views through the section 6—6 of FIG. 5, each view showing the same parts but in a different relative position.

Referring to FIG. 1, a base 10 supports the entire apparatus assembly. Four flanges 12 are secured to base 10 and each flange 12 supports a vertical post 14. Attached to each vertical post 14 is a bracket 16. The brackets 16 support a pair of parallel rails 18 and 20. A block 22 is provided with an interior bearing 23 so that it receives and rides along rail 18 and a block 24 is provided with an interior bearing 25 so that it receives and rides along rail 20. A pair of parallel tie bars 26 and 28 extend through blocks 22 and 24 transversely with respect to rails 18 and 20. A motor 30 is secured to one end of tie bars 26 and 28 by means of flanges 32 while a floating cutting tool assembly 34 is secured to the opposite end of tie bars 26 and 28.

Floating cutting tool assembly 34 appears in perspective view in FIG. 1 and in cross-sectional view in FIGS. 2 and 2A. Assembly 34 comprises a pair of parallel mounting blocks including upper block 36 and lower block 38. Upper block 36 is a stationary or anchor block while lower block 38 is a floating block and is vertically moveable relative to upper block 36. Four vertical posts 40 are fixedly secured at their lower ends to lower block 38 and extend upwardly through but substantially free of contact with corresponding relatively large openings in upper block 36. A central stud 42 is fixedly secured to lower block 38 at the center thereof and extends upwardly through but substantially free of contact with a corresponding opening in the center of upper block 36. As is shown clearly in FIGS. 2 and 2A, posts 40 and stud 42 are slightly smaller than their respective corresponding openings in upper block 36 to permit posts 40 and stud 42 to be slideable with respect to upper block 36. The upper end of stud 42 is threaded and engages nut 44. The region of each post 40 between upper block 36 and lower block 38 is enclosed by individual spring means 46 under compression. Lower block 38 is gravity biased in the direction of base 10 and spring means 46 is positioned to cooperate with said gravity bias during a cutting operation to urge block 38 in the direction of base 10 so that no external downward or vertical force is required on the apparatus during a cutting operation. As is clearly shown in FIG. 2, the position of nut 44 establishes the maximum distance that the compressive stress in springs 46 can urge lower block 38 away from upper block 36, while FIG. 2A shows that an external upward force upon lower block 38 can urge lower block 38 closer to upper block 36 by subjecting springs 46 to increased compressive stress.

Referring again to FIG. 1, motor 30 is provided with a drive shaft 48 to which is attached a pulley 50. A driven shaft 52 has a pulley 54 attached to one end thereof. Pulleys 50 and 54 are connected by means of belt 56. Driven shaft 52 extends underneath block 24 and through lower block 38. The portion of driven shaft 52 extending through lower block 38 is surrounded by a bearing 58 to permit rotation of shaft 52. Although shaft 52 is mounted on and is jointly vertically moveable with lower block 38, bearing 58 permits shaft 52 to be rotatable relative to lower block 38. A round, serrated saw 60 is secured to the end of shaft 52.

A laminated work sample 62 is held securely upon base 10 in a position underneath saw 60 by means of four clamps 64, each provided with a tightening knob 66. Work sample 62 has an upper lamina 68 bonded to a lower lamina 70. The apparatus is adapted to make a longitudinal cut along the surface of work sample 62 as indicated by the dashed line 72 by utilizing handle 74 to move the apparatus along the rails 18 and 20.

The apparatus of FIG. 1 operates in the following manner. Motor 30 rotates shaft 48 and pulley 50. By means of belt 56, pulley 50 rotates pulley 54, shaft 52 and saw 60. By utilizing handle 74, rotating saw 60 is moved longitudinally along the line 72 on work sample 62.

If the upper lamina 68 of the work sample is a relatively soft material, such as point, plastic, or wood, and the lower lamina 70 is a relatively hard material, such as steel or other metal, and it is desired to cut completely through the upper lamina 68 without cutting any portion of the lower lamina 70, the nut 44 is adjusted so that stud 42 fixes the maximum cut depth, putting springs 46 under compression as indicated in FIG. 2. By rotating nut 44 clockwise or counter-clockwise, a relatively shallower or deeper cut depth, respectively, can be provided. At a suitable setting of nut 44, as the saw 60 is moved longitudinally along the work sample it cuts entirely through upper lamina 68 as shown at position A in FIG. 3. Upon reaching a peak 76 in the contour of lower lamina 70, saw 60 rides upwardly, as indicated by position B in FIG. 3, raising posts 40, and stud 42 with nut 44, relative to upper block 36, and placing increased compressive stress upon springs 46, as is shown in FIG. 2A. Position C of FIG. 3 shows saw 60 riding on an intermediate plateau of lower lamina 70, for which level nut 44 would be intermediate to its position in FIGS. 2 and 2A. As is shown in FIGS. 2 and 2A, nut 44 provides the only mechanical stop to prevent saw 60 from cutting below any predetermined level, although nut 44 does not prevent saw 60 from cutting on a level above said predetermined level. Dashed line 78 indicates the locus of the axis of saw 60 and shows how the axis of saw 60 reacts to the counter of lower lamina 70.

FIG. 4 shows that saw 60 can be positioned to make a partial or intermediate cut in lamina 68 while following the contour of only the peaks of lower lamina 70. The position of nut 44 on stud 42, as shown in FIG. 2, can be established so that when nut 44 rests on block 36 the maximum depth of saw 60 in upper lamina 68 is only a portion of the distance to lower lamina 70, as indicated at position A in FIG. 4. Upon reaching peak 76 of lower lamina 70, saw 60 rides upwardly as shown at position B in FIG. 4, raising block 38 relative to block 36 against the force of springs 46, as indicated in FIG. 2A. When the saw reaches position C in FIG. 4 it resumes cutting at the intermediate level of position A, whereupon nut 44 again rests tightly against block 36 as is shown in FIG. 2.

In the apparatus of FIG. 5, the spring means is under tension rather than compression. In the embodiment of FIG. 5, the entire cutting assembly is supported upon a platform 80 which is rotatably pivoted at one end upon bar 82. Platform 80 is elevated with respect to base 84 by means of a pair of supports 86. A motor 88 having an attached drive pulley 90 is supported upon platform 80 directly above pivot 82. Drive pulley 90 actuates driven pulley 92 by means of belt 94. Driven pulley 92 is attached to one end of shaft 96 while serrated saw 60 is attached to the opposite end of shaft 96. Shaft 96 extends through and is supported by platform 80. Bearing 98 surrounds shaft 96 to permit rotation of shaft 96 relative to platform 80.

Saw 60 is urged against work sample 62. Work sample 62 has upper lamina 68 and lower lamina 70 and is secured to work sample holder 104. Work sample holder 104 is elevated with respect to base 84 by means of a pair of brackets 100. Brackets 100 support a pair of rails 102. Work sample holder 104 is provided with interior bearings 105 to permit it to ride on rails 102 and is motivated by means of handle 106. Work sample 62 is held securely upon work sample holder 104 by means of a plurality of clamps 110, each clamp being provided with a tightening knob 108.

A rib 112 protrudes from one end of platform 80. As is clearly shown in FIGS. 6 and 6A, studs 114 and 116 extend through rib 112. Stud 114 is threadedly secured to rib 112 and is sufficiently long so that its terminus can contact base 84 at point 85. Stud 116 is relatively short and does not extend to base 84. A spring 118 under tension is hooked at one end to the bottom of stud 116 and is secured at the other end to base 84 by means of hook 120 whereby base 84 serves as a stationary anchor for spring 118. Stud 116 extends through rib 112 free of contact with rib 112 but is provided with threads for engagement with nut 122 which rests on the upper surface of rib 112. Rotation of nut 122 can raise or lower stud 116 relative to rib 112, thereby increasing or decreasing, respectively, the tension in spring 118. The tension in the spring is varied by rotation of nut 122 rather than by rotation of stud 116 because spring 118 is hooked to the end of stud 116, thereby preventing rotation of stud 116.

Stud 114 functions as a mechanical stop. By rotating stud 114 at least until the terminus thereof contacts base 84, a minimum distance between rib 112 and base 84 is established which cannot be reduced without further adjustment of stud 114. While stud 114 establishes a minimum distance between rib 112 and base 84 it does not prevent an increase in the distance between rib 112 and base 84 and such increase can be accomplished against the tension in the spring 118, whereupon the bottom of stud 114 is elevated above base 84, as is shown in FIG. 6A.

The mode of operation of the apparatus of FIG. 5 is as follows. Motor 88 rotates pulley 90 which, by means of belt 94, in turn rotates pulley 92, shaft 96, and saw 60. Rotating saw 60 cuts into work sample 62. Longitudinal movement of the work sample along rails 102 is accomplished by means of handle 106 whereby saw 60 makes a longitudinal cut 72 in the work sample. The method of adjustment of the depth of the cut 72 into work sample 62 will be apparent by referring to FIGS. 6 and 6A in conjunction with FIG. 4. FIG. 4 shows saw 60 making a partial cut into a relatively soft upper lamina 68 of work sample 62. The maximum depth of the cut of saw 60 into upper lamina 68, as shown at position A in FIG. 4, is established by adjustment of stud 114 to a position of contact with base 84, as shown in FIG. 6, which establishes a clearance between rib 112 and base 84 which corresponds to the desired depth of the cut. When the saw 60 reaches peak 76 of relatively hard lower lamina 70 it follows the contour of said peak, as shown in positions B of FIG. 4. This forces rib 112 to rise against the tension in spring 118 so that the platform 80 rotates counter-clockwise on the pivot 82. Rib 112 thereby rises relative to base 84 and base 84 serves as a stationary anchor for rib 112 and spring 118. When saw 60 rides onto peak 76, the bottom of stud 114 is lifted above base 84, as shown in FIG. 6A. After saw 60 passes peak 76, the tension in spring 118 and, to a smaller extent, the weight of platform 80, causes saw 60 to return to the pre-established cutting depth in relatively soft lamina 68, as indicated at position C in FIG. 4. If saw 60 were to drop abruptly rather than gradually from any position B to another position C, the weight of platform 80 and the tension in spring 118 would tend to induce an overshoot resulting in a deeper cut at position C than at position A. However, any overshoot in cut depth at position C is advantageously prevented in the described apparatus by the impingement of the terminus of stud 114 upon base 84 at point 85.

The mode of operation of the apparatus of FIG. 5, as described, shows that as saw 60 travels from position A to a position B in FIG. 4, studs 114 and 116 are moved from the position shown in FIG. 6 to the position shown in FIG. 6A. At the same time platform 80 swings upwardly along the arc 124 upon the pivot 82. Thereupon, as saw 60 travels from position B to position C, studs 114 and 116 revert from the position shown in FIG. 6A to the position shown in FIG. 6. During this latter movement platform 80 swings downwardly along the arc 124 upon the pivot 82. Impingement of the terminus of stud 114 upon base 84 prevents overshoot in the depth of the cut during this latter movement.

Various changes and modifications can be made without departing from the spirit of this invention or the scope as defined in the following claims.

We claim:
1. A process for producing a longitudinal cut through an upper and relatively soft lamina of a laminated material which cut follows the contour of at least the peaks of a lower and relatively hard lamina of said laminated material, said process comprising moving a cutting tool longitudinally relative to said material, gravity biased spring means resiliently and continuously urging said cutting tool to penetrate said relatively soft lamina with no external downward force being applied during the cutting operation, mechanically limiting the maximum depth of penetration of said cutting tool into said relatively soft lamina without otherwise mechanically limiting penetraton of said cutting tool into said relatively soft lamina, said cutting tool being forced to resiliently retract upon contact with peaks in said relatively hard lamina so that said cutting tool follows the contour of said peaks without penetrating said relatively hard lamina, and said cutting tool continuously being resiliently urged to return to said maximum depth of penetration when out of contact with said peaks.

2. A process for producing a longitudinal cut through an upper and relatively soft lamina of a laminated material which cut follows the contour of a lower and relatively hard lamina of said laminated material, said process comprising moving a cutting tool longitudinally relative to said material, spring means resiliently and continuously urging said cutting tool to penetrate said relatively soft lamina with no external downward force being applied during the cutting operation, mechanically limiting only the maximum penetration of said cutting tool so that said cutting tool is continuously urged against said relatively hard lamina without penetrating said relatively hard lamina, said resilient force permitting said cutting tool to resiliently retract upon contact with peaks in said relatively hard lamina so that said cutting tool follows the contour of said peaks without penetrating said relatively hard lamina.

3. The process of claim 2 wherein said material is moved longitudinally relative to said resilient cutting tool.

4. The process of claim 2 wherein said cutting tool is a rotating saw.

5. The process of claim 2 wherein said cutting tool is resiliently urged into said material by means of spring means having means for adjusting the stress thereof.

6. The process of claim 2 wherein said spring means is under tension.

7. The process of claim 2 wherein said spring means is under compression.

References Cited
UNITED STATES PATENTS

| | | |
|---|---|---|
| 2,219,467 | 10/1940 | Booth. |
| 3,165,951 | 1/1965 | Lindquist _____ 83—12 |
| 3,355,788 | 12/1967 | Gunter et al. _____ 83—5 |

WILLIAM S. LAWSON, Primary Examiner

U.S. Cl. X.R.
83—12